(12) United States Patent
Maier

(10) Patent No.: US 10,836,100 B2
(45) Date of Patent: *Nov. 17, 2020

(54) STERILE ENVIRONMENT FOR ADDITIVE MANUFACTURING

(71) Applicant: Nathan Christopher Maier, Hayward, CA (US)

(72) Inventor: Nathan Christopher Maier, Hayward, CA (US)

(*) Notice: Subject to any disclaimer, the term of this patent is extended or adjusted under 35 U.S.C. 154(b) by 177 days.

This patent is subject to a terminal disclaimer.

(21) Appl. No.: 16/011,386

(22) Filed: Jun. 18, 2018

(65) Prior Publication Data

US 2018/0297271 A1 Oct. 18, 2018

Related U.S. Application Data

(62) Division of application No. 14/614,952, filed on Feb. 5, 2015, now Pat. No. 10,000,009.

(51) Int. Cl.
*B29C 64/112* (2017.01)
*B29C 64/255* (2017.01)
*B29C 64/259* (2017.01)
*B29C 64/118* (2017.01)
*B29L 31/00* (2006.01)

(52) U.S. Cl.
CPC .......... *B29C 64/112* (2017.08); *B29C 64/118* (2017.08); *B29C 64/255* (2017.08); *B29C 64/259* (2017.08); *B29C 2791/005* (2013.01); *B29L 2031/772* (2013.01)

(58) Field of Classification Search
CPC .......................... B29C 64/112; B29C 64/259
See application file for complete search history.

(56) References Cited

U.S. PATENT DOCUMENTS

| | | | | | |
|---|---|---|---|---|---|
| 4,936,456 | A | * | 6/1990 | Bell | B65D 33/00 206/439 |
| 5,322,516 | A | * | 6/1994 | Brugger | A61M 39/04 600/578 |
| 5,348,392 | A | * | 9/1994 | Bouquet | A61C 9/0026 222/137 |
| 5,364,369 | A | * | 11/1994 | Reynolds | A61J 1/2089 604/187 |
| 5,382,230 | A | * | 1/1995 | Bonn | A61B 17/3462 137/613 |
| 6,401,001 | B1 | * | 6/2002 | Jang | H01L 21/288 700/118 |

(Continued)

*Primary Examiner* — Leith S Shafi
*Assistant Examiner* — Nicholas R Krasnow
(74) *Attorney, Agent, or Firm* — Thomas Schneck

(57) ABSTRACT

In sterile, additive manufacturing wherein one lamella is successively built upon an underlying lamella until an object is completed, a sterile manufacturing environment is provided. A major chamber large enough to accommodate the manufactured object has sterile accordion pleated sidewalls and a sterile top closed with flap valves. A minor chamber for supporting the nozzles positioned above the major chamber has similar valves in corresponding positions. Nozzles for material deposition penetrate the pair of valves to block air and particles from entry into the major chamber where the nozzles make layer by layer deposition of the object using XY areawise nozzle motion relative to the object as well as Z nozzle vertical motion with the major chamber expanding as the object is formed.

20 Claims, 9 Drawing Sheets

(56) References Cited

U.S. PATENT DOCUMENTS

| | | | | |
|---|---|---|---|---|
| 6,485,471 | B1* | 11/2002 | Zivitz | A61M 5/1452 |
| | | | | 604/181 |
| 6,599,280 | B1* | 7/2003 | Pynson | A61F 9/00727 |
| | | | | 604/403 |
| 6,673,598 | B1* | 1/2004 | Akers | C12M 23/14 |
| | | | | 435/297.2 |
| 7,731,986 | B2* | 6/2010 | Wright | A61K 47/20 |
| | | | | 424/423 |
| 8,240,521 | B2* | 8/2012 | Py | B05B 11/3077 |
| | | | | 222/492 |
| 9,180,252 | B2* | 11/2015 | Gelblum | A61M 5/148 |
| 10,414,089 | B2* | 9/2019 | Maier | B29C 64/118 |
| 2003/0109853 | A1* | 6/2003 | Harding | A61M 39/045 |
| | | | | 604/536 |
| 2004/0043481 | A1* | 3/2004 | Wilson | C12M 23/24 |
| | | | | 435/297.1 |
| 2006/0156978 | A1* | 7/2006 | Lipson | A61L 27/3817 |
| | | | | 118/708 |
| 2012/0068378 | A1* | 3/2012 | Swanson | B29C 64/106 |
| | | | | 264/308 |
| 2014/0013962 | A1* | 1/2014 | Lipton | A47J 43/25 |
| | | | | 99/353 |
| 2014/0048980 | A1* | 2/2014 | Crump | B29C 64/25 |
| | | | | 264/401 |
| 2015/0093465 | A1* | 4/2015 | Page | B29C 48/0021 |
| | | | | 425/132 |

* cited by examiner

STERILE ENVIRONMENT FOR ADDITIVE MANUFACTURING

CROSS-REFERENCE TO RELATED APPLICATION

This application is a divisional of pending U.S. patent application Ser. No. 14/614,952 filed Feb. 5, 2015 which claims priority from provisional application Ser. No. 61/935,844, filed Feb. 5, 2014, now U.S. patent Ser. No. 10/000,009 issued Jun. 19, 2018, for an invention entitled STERILE ENVIRONMENT FOR ADDITIVE MANUFACTURING.

TECHNICAL FIELD

The invention relates to sterile 3-D manufacturing using layering of 2-D lamellas.

BACKGROUND

Due to increasing popularity and significant technological developments in the field of additive manufacturing, it has become critical to develop an efficient, sterile, and disposable chamber for 3D printing. As physicians, manufacturing professionals, and individuals make more common use of 3D printing systems, there will be a need to print many different types of materials, including tissue, in a sterile chamber which can simply and rapidly be exchanged to allow for printing of diverse materials. An article in New York Times, Jan. 27, 2015 entitled "The Operation Before the Operation", p. D6, describes a need for anatomical models for medicine and the use of 3D printed models.

The need for making anatomical models and actual body parts by additive manufacturing was realized many years ago. The state of the art in this field several years ago was summarized in an article entitled "Rapid prototyping techniques for anatomical modeling in medicine" by M. McGurk et al. in Ann. R. Coll. Surg. Engl. 1997; 79; 169-174 wherein 3-D printing of models was described. Models were created by spraying liquid through ink jet printer nozzles on a layer of precursor powder, creating a solid thin slice. The printing process was repeated for each subsequent slice until the object was completed as a "green-state" part that was then fired in a furnace to sinter it. The resulting object was then further treated to make a full density part.

In recent years the development of software for computer controlled robotic X-Y motion systems used in the semiconductor and optics industries has made 3D printing of large objects easier than in former years. Software programs such as SolidWorks, AutoCad 360, and similar software programs make layered construction of 3D objects a relatively low cost and fast task for 3D printing equipment.

To achieve 3D printing of larger objects, print nozzles are directed in the X-Y plane either by placing the object to be made on an X-Y table wherein motion is provided below the nozzles, or mounting rails above the nozzles for X-Y motion directed from above the nozzles. An example of an X-Y table for motion below the nozzles is shown in U.S. Pat. No. 5,760,500 to T. Kondo et al. wherein linear actuators or stepper motors provide independent motion to a table over the X-Y plane. Highly accurate stepper motors for this purpose are described in U.S. Pat. No. 7,518,270 to R. Badgerow and T. Lin. A 3-D printer with overhead control of nozzles is described in U.S. Pat. No. 5,740,051 to R. Sanders et al.

In either motion situation, the nozzles move in the X-Y plane relative to the printed object and also move up in the Z plane starting from a lower level and proceeding upwardly. A layer or lamella is first printed at a low level and then the next layer up is printed and so on until the model or object is completed. Sometimes two nozzles are used, including a first nozzle to spray or extrude a manufacturing material, such as a polymer, and a second nozzle to spray a support fluid for the manufacturing material, which may be soft or viscous. An example of a support fluid may be an ink jet sprayed, ultra violet light cured resin. When the manufacturing material hardens, the faster drying support fluid is dissolved out. The use of chamber or accordion pleated sleeves in glovebox environments is known from U.S. Pat. No. 3,456,812 to J. Gandolfo et al.

Currently, many researchers, industry professionals, and individuals are looking to additive manufacturing by 3D printing as the future of custom manufacturing of everything from organs to food products. Additive manufacturing provides the flexibility to produce diverse items very rapidly and at much lower cost than many previous manufacturing methodologies. In particular, additive manufacturing technology by 3D printing techniques for patient-specific and potentially patient-derived tissue and bone using tissue and stem cells. An object of the invention was to develop a sterile manufacturing environment compatible for 3D printing equipment that could be used for biological object manufacturing, as well as the validation of effective post-manufacturing sterilization of the manufacturing equipment.

SUMMARY

The above object has been achieved with a disposable, sterile environment additive manufacturing chamber that includes a rigid baseplate with suction or self-adhesive bottom to adhere to the 3D printer base. Relative motion of the printheads with respect to the baseplate is provided during manufacturing, with deflection without dimensional variations. The sterile environment is provided by flexible, accordion-type sides in a major chamber which is sterile on the inside and sealed to the baseplate. The sidewall construction resembles a pleated Chinese lantern. The sidewall construction involves some portion that has qualities of tough filter paper, such as Tyvek, and the rest of which could optionally be transparent or opaque Mylar or nylon or other plastic or paper combination. Tyvek is a registered trademark of the DuPont Company for non-directional, non-woven, high density polyethylene or olefin fibers of diameter in the range of 0.5 to 10 micrometers, bonded together by heat and pressure without binders. The resultant major chamber structure is attached to the baseplate and can be stretched in the x, y, z coordinates as the printing heads move during printing. A flexible, stretchable lid is sealed to the sides to close the chamber.

A minor chamber is removably fastened to the lid of the major chamber. The minor chamber provides support for the printheads. The minor chamber encloses a printhead support block and need not be much larger than needed for the support block. Both chambers have spatially separated flap valves that are openable at a central print nozzle entry. The set of flap valves are openable one at a time when nozzles penetrate an opening so that air or particles cannot directly enter the major chamber where 3D printing will occur, similar to double doors in a building blocking wind from entry or airlocks on a ship. The lid has 3 or more removable attachment tabs that join the major and minor chambers. The major chamber has sidewall guide straps to keep the lid and sidewall of the major chamber from touching or dragging over the object being manufactured as well as a central attachment port for the manufacturing head to be attached. Quick-detachable and disposable manufacturing head subassemblies and nozzles attach to the non-disposable manufacturing heads of the 3D printer. The heads may include an extrusion head, nozzle and feeders or a sputter/spray jet and nozzle which may contact the material being printed. These parts are disposed after each use.

In summary, a pair of chambers provides a sterile environment for 3D printing of lamellas. A first major chamber has a sterile interior that provides the manufacturing environment with sealed entry of droplet nozzles while a second minor chamber, atop the first chamber, provides for another sealed entry of the nozzles in a manner so that both entries cannot be open at the same time, blocking air and particles from entry into the major chamber. The nozzles deposit layers of structures under computer control from software models of the structures while the major chamber allows for independent X-Y motion and Z motion of the nozzles. Some examples include chambers for printing tissue, living or dead; tissue substrates such as hydroxyapatite, collagen fibers, proteoglycan, and elastin fibers or biological organs or models of organs within a sterile yet disposable chamber. Similar examples to those described above could be employed with alternative additive manufacturing head types such as sputter manufacturing, plasma deposition, fused deposition modeling (FOM), electron-beam freeform fabrication (EBF3), direct metal laser sintering (OMLS), electron-beam melting (EBM), selective laser melting (SLM), selective heat sintering (SHS), laminated object manufacturing (LOM), stereolithography (SLA), digital light processing (OLP), multi-jet modeling (MJM), etc. Similar examples to those described above could be employed with combinations of material supply heads to combine extruded materials with sputtered/sprayed materials in one chamber.

DETAILED DESCRIPTION

Figure 1:
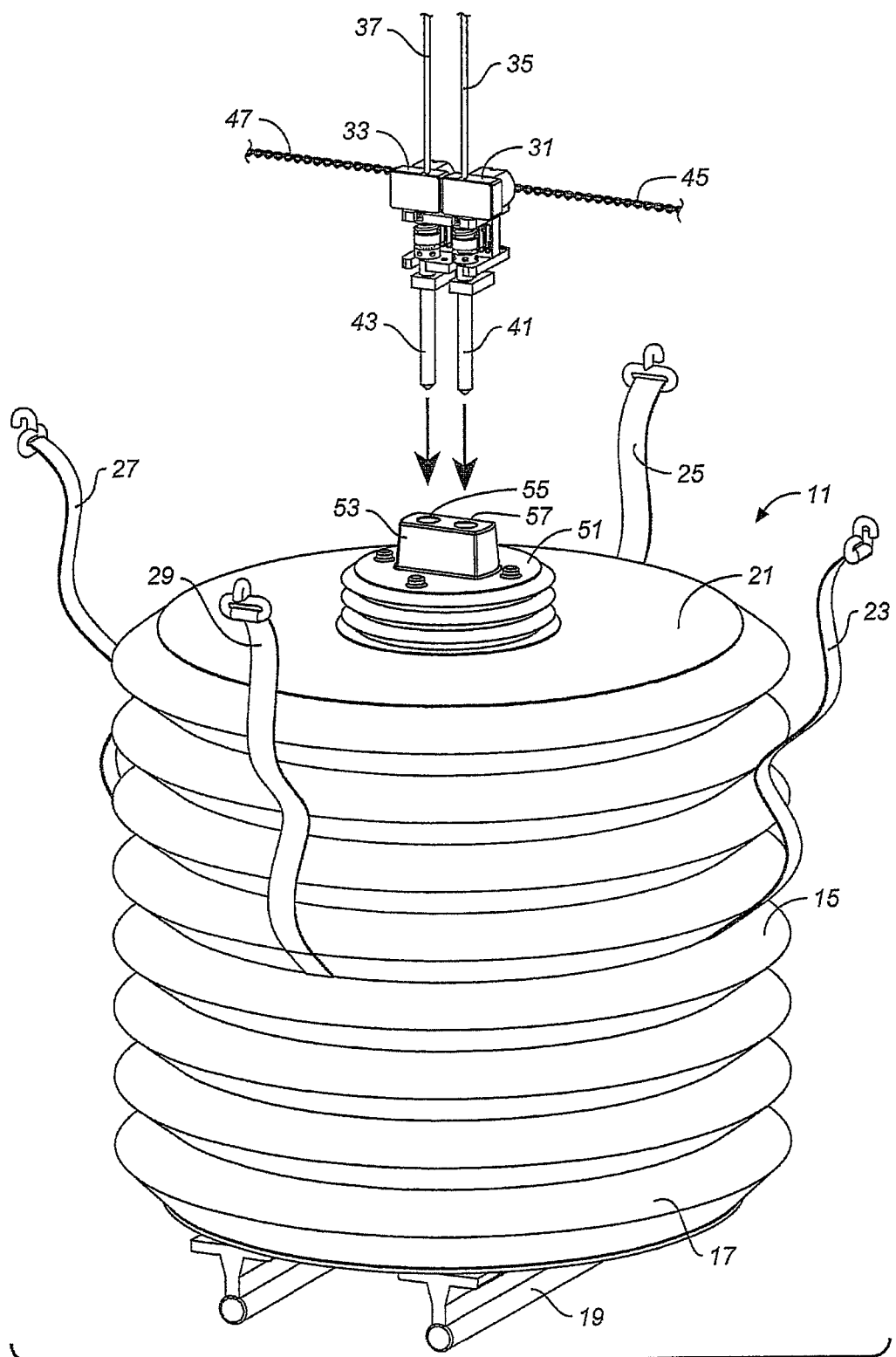
FIG. 1 is a front perspective view of a sterile environment for additive manufacturing in accordance with the invention wherein a plurality of nozzles is disposed for entry into the environment.

With reference to FIG. 1, a sterile manufacturing environment 11 is used for additive manufacturing. A principal component is a major chamber 15 that is closed at its bottom by being attached to the work table 17 that is fixedly attached to rails 19. The major chamber 15 has a sterile interior that is closed at its top by top closure 21. Chamber 15 is sufficiently large for accommodating a three-dimensional object such as a model of a human skull but is sufficiently small to fit within a 3D printer printing chamber.

The inside of chamber 15 is sterilized prior to use by any conventional means. The outside of chamber 15 is exposed to the ambient environment and is not sterile. Side straps 23, 25, 27 and 29 provide lateral X-Y guiding motion to flexible sidewalls of the chamber 15 to track XY motion of printheads 31 and 33. Note that one or both of the printheads may operate by extrusion of material. For purposes of this patent application, extrusion through a nozzle is considered to be printing. Nozzles 41 and 43, associated with printheads 31 and 33, respectively, move in the Z direction, shown by arrows Z, under control of a robotic arm, not shown. Nozzles 41 and 43 move through a nozzle support fixture 53, particularly nozzle holders 53 and 57, in the minor chamber 51 atop the top closure of major chamber 15. The minor chamber 51 is significantly smaller than the major chamber 15. The major chamber must be able to filter air passing through sidewalls of the chamber for expansion and contraction.

The work table 17 is mounted to an XY table in the base of manufacturing equipment in a fixed manner in the orientation best applicable to the item being printed. Of critical importance is that the baseplate be restricted from independent X,Y motion, apart from the XY table on which it rests, as well as independent deflection in the Z orientation apart from the previously mentioned Z motion in a robot arm during the printing process to maintain dimensional integrity of the item being printed. Alternatively, the XY motion is provided by overhead rails moving the printheads and no XY table is needed.

Flexible, accordion-style pleated sides of major chamber 15 resemble a Chinese lantern or an upside-down origami cone with the lantern or cone attached and sealed to the work table to maintain the sterile barrier. The work table 17 is attached to rails that are part of an XY table that provides relative XY motion to the printheads during 3D manufacturing. Sidewalls of the major chamber are moved via clips or elastic straps 23, 25, 27 and 29 by coordination with the XY table to keep the sides of the major chamber 15 from contacting the printed object during the manufacturing process. To facilitate changes in volume of the chamber, a panel or portion of the side or top would be constructed of accordion pleated Tyvek or equivalent breathable sterile barrier. The entire accordion-style sidewall structure could be constructed of Tyvek or equivalent to provide sufficient breathability. Portions of the sidewall structure could also be constructed of Mylar or nylon to facilitate visual inspection of the item being manufactured during processing. The sidewall structure could be provided with a pealable portion to allow easy access to the printed item once the sterile barrier can be broken for use.

Additionally, quick-detachable and disposable printheads or disposable material extrusion heads, described below in FIG. 8, both called "printheads" 41 and 43 are supplied by supply lines 35 and 37, whether the supply is liquid to be extruded into the printer or ink-like material to be used for supporting the structure under construction. Electronic control lines 45 and 47 provide signals and power to the printheads in the usual manner. The printheads are joined and sealed to the top of the minor chamber 51 so that a sealable entry of nozzles into the major chamber 15 is aligned with a corresponding position for nozzle sealable entry into the minor chamber 51 as explained below.

Figure 2:
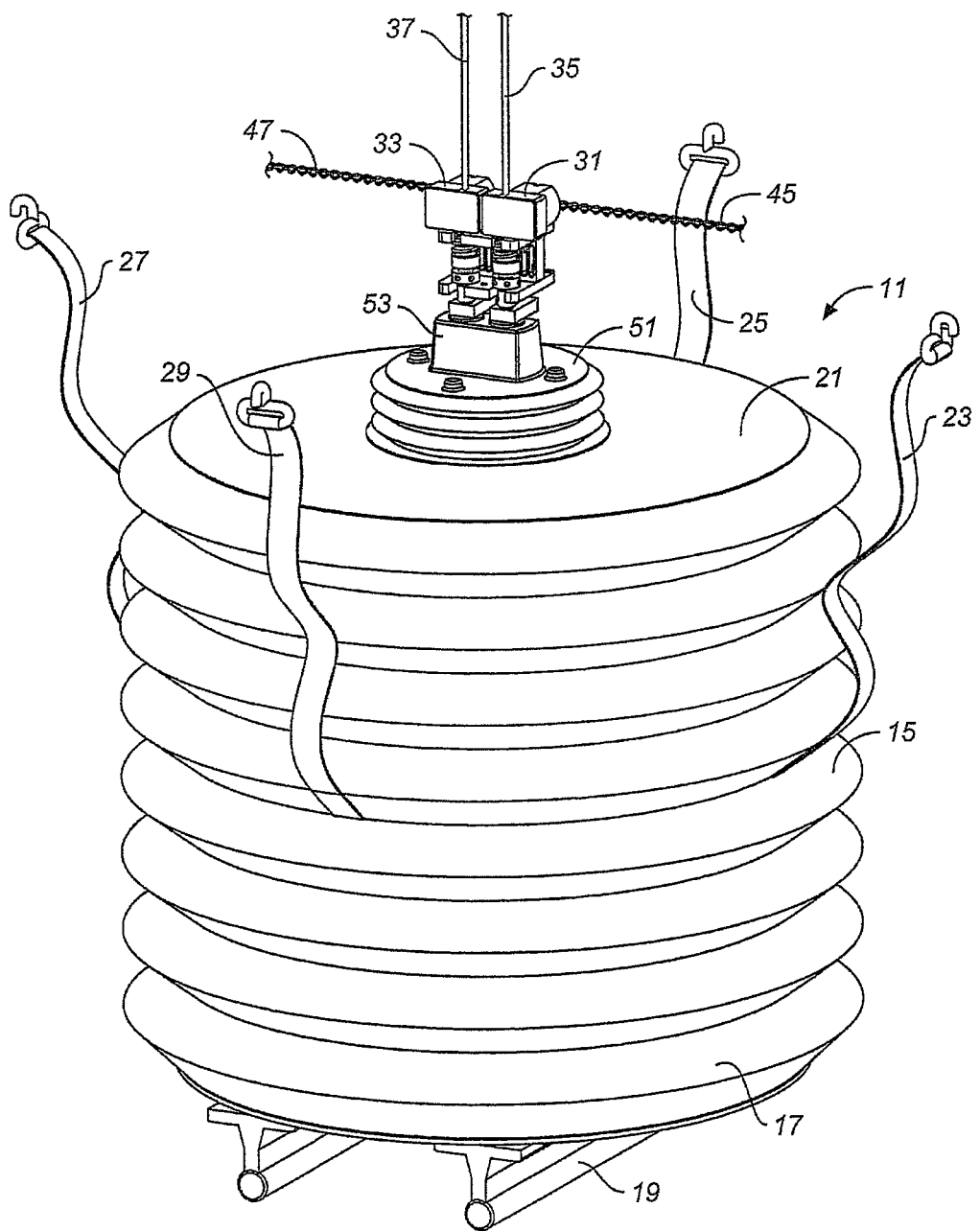
FIG. 2 shows the apparatus of FIG. 1 with the plurality of nozzles entrant into the environment.

With reference to FIG. 2, the printheads 31 and 33 are shown to be engaged with nozzle support 53 in minor chamber 51. The nozzles, not shown, have passed through the minor chamber 51 and have entered the major chamber 15 prior to printing. Engagement of the printheads 31 and 33 with the nozzle support is in an airtight manner, for example, by use of a gasket.

Figure 3:
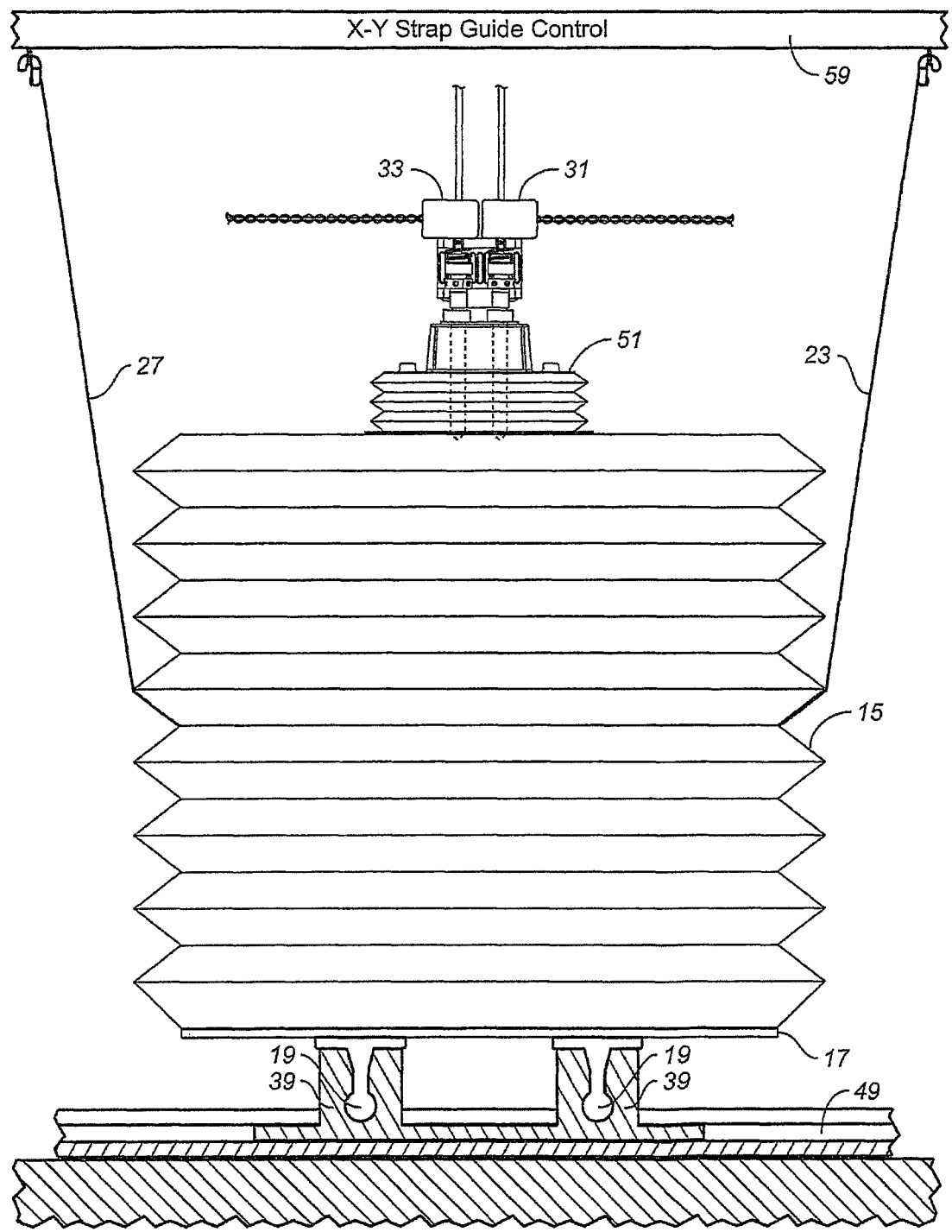
FIG. 3 is a front partial cut-away view of the apparatus of FIG. 2 showing an X-Y motion table connected thereto.

In FIG. 3, XY motion to the work table 17 is provided by rails 19 sliding in X rail support 39 and driven by a stepper motor or linear actuator. In turn, the X rail support 39 moves in a Y rail support 49 in a manner typical for XY tables. Relative XY motion need not be provided by an XY table below the nozzles but could be provided from above the nozzles, with the work table fixed to a permanent surface. XY table motion is coordinated with the XY strap control guide 59 that pulls on side straps 23, 25, 27 and 29 to keep sidewalls of the major chamber out of the way of the printheads moving in the Z direction.

Figure 4:
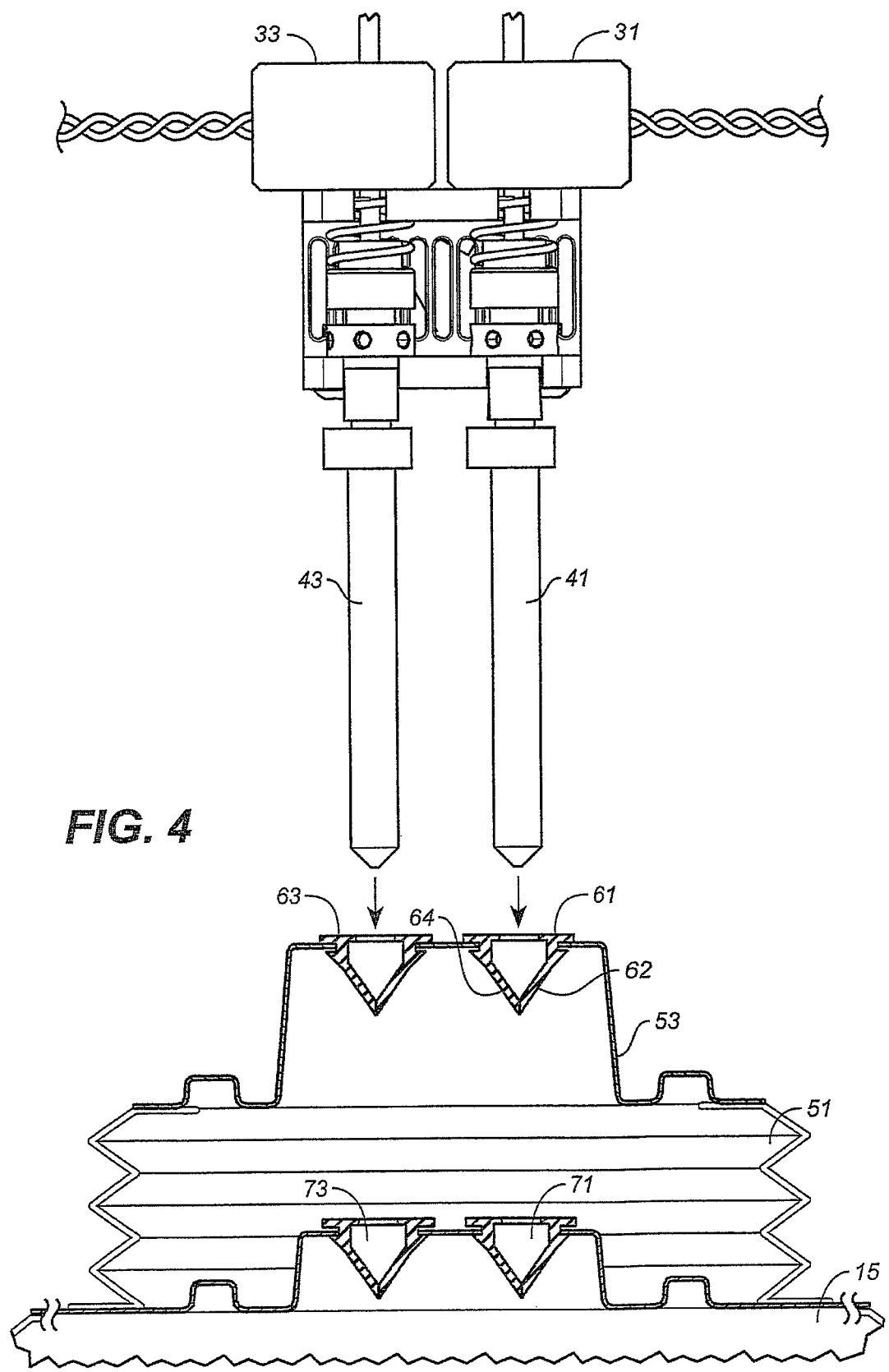
FIGS. 4-6 are front plan views showing successive views of nozzle entry into valve sealable entry ports of the apparatus of FIG. 1.
Figure 5:
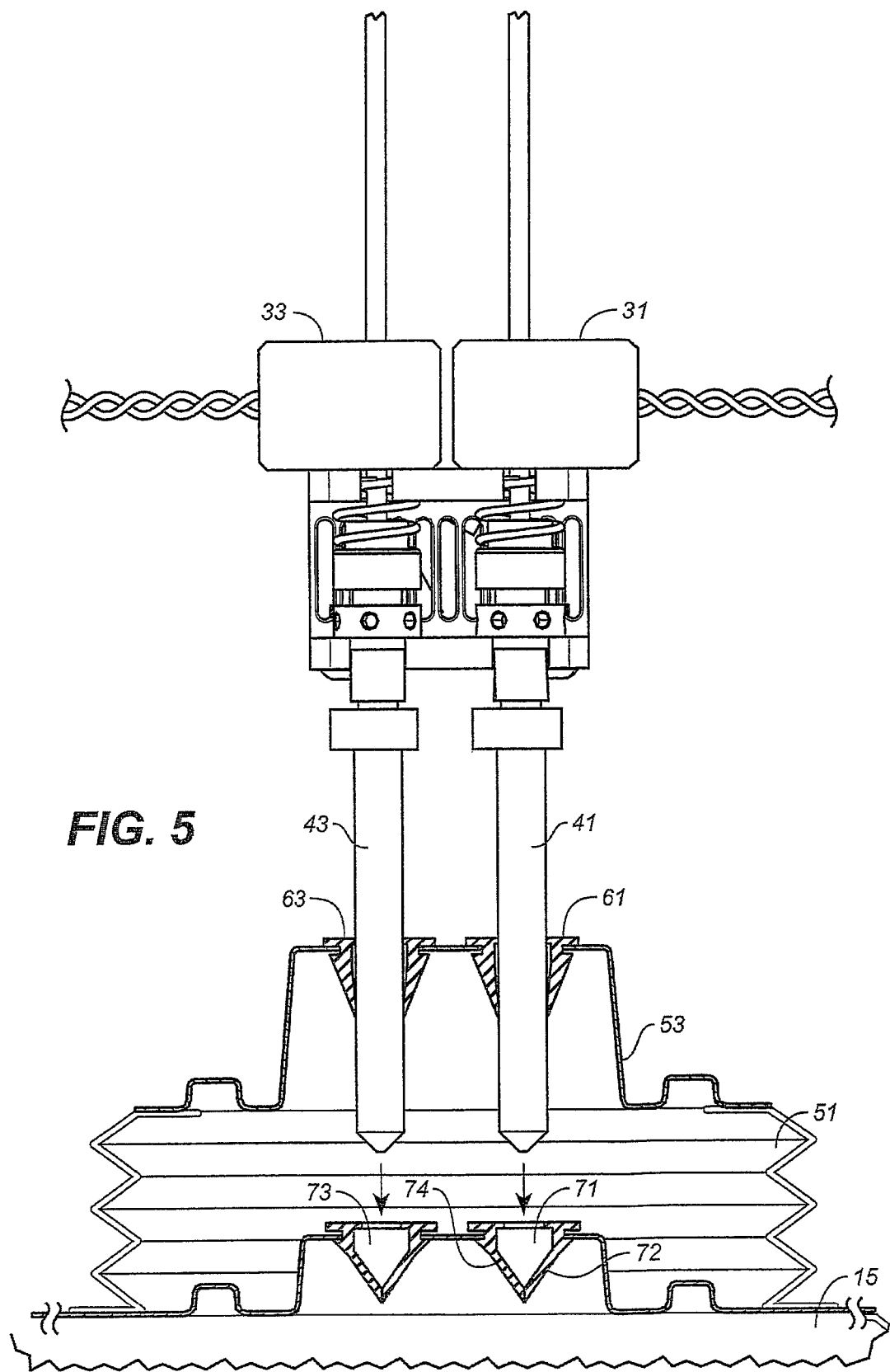
Figure 6:
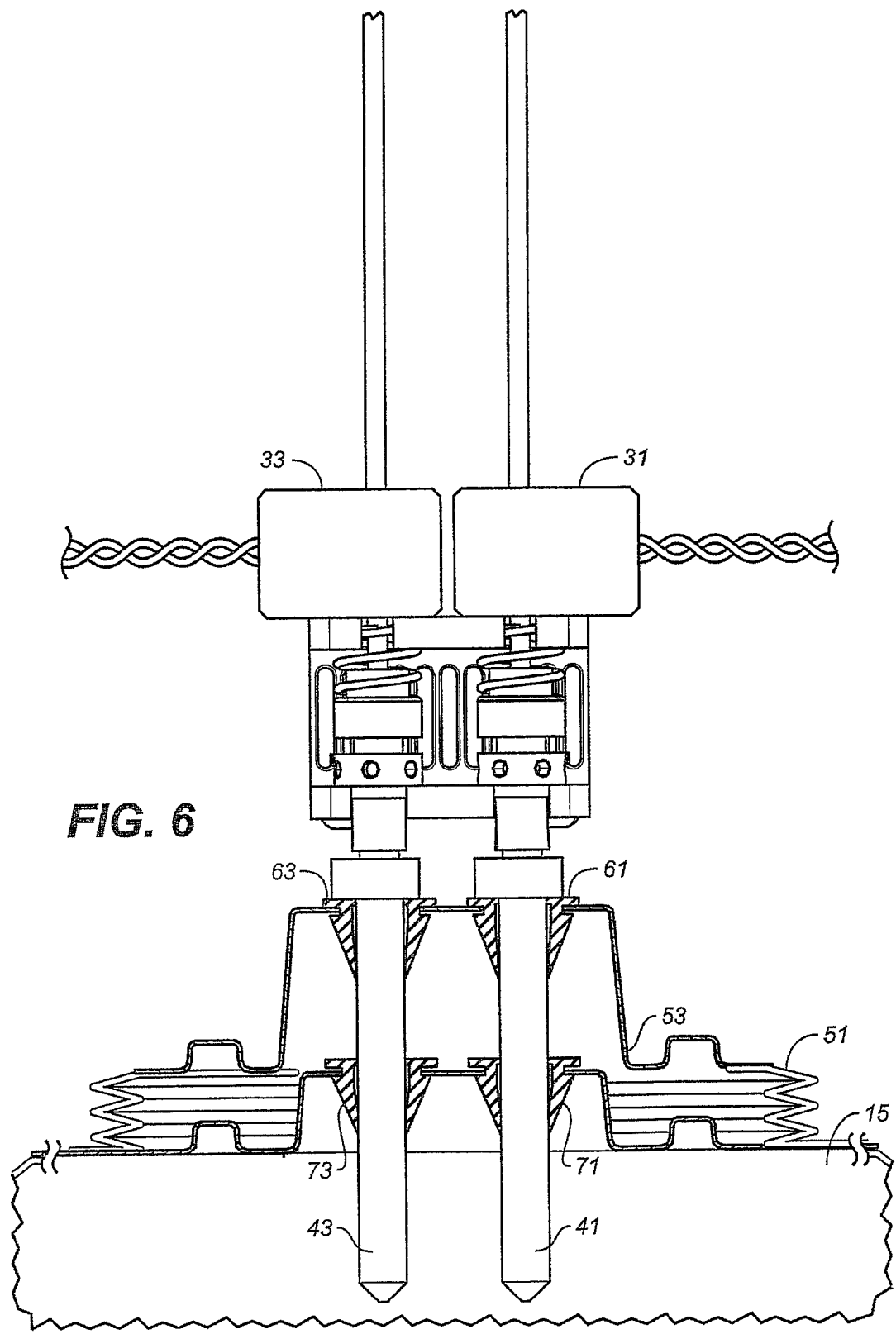

A key feature of the invention is the sequential valving of entry ports for nozzles moving into the major chamber. With reference to FIG. 4, a first set of flap valves 61 and 63, associated with the nozzle support 53 of minor chamber 51 corresponds to expected positions of the nozzles 41 and 43 of the respective printheads 31 and 33. Flap valve 61 has side pivoting flexing flaps 62 and 64 that are center opening and made of elastomeric material, such as rubber. A downwardly extending nozzle can readily open a flex flap with the flap material adhering to the side of nozzle by its elastomeric property, maintaining a partial seal by friction contact with the nozzle. This partial seal prevents any significant amount of air or particle entry past the flap valve. However, a second set of similar valves 71 and 73 associated with the top closure of major chamber 15 further presents air and particle entry into the major chamber 15 as the valves move down into the major chamber. In FIG. 5, the nozzles 41 and 43 are shown to have penetrated through the flap valves 61 and 63 with the flaps 62 and 64 adhering to sidewalls of the nozzles with sliding friction contact. The nozzles are seen approaching the second sealable entry port formed by flap valves 71 and 73. In FIG. 6, the nozzles 41 and 43 are shown to have penetrated through both sets of flap valves including the first set 61 and 63 that form a second valve sealable entry port and the second set 71 and 73 that form a first valve sealable entry port for the major chamber 15. While two nozzles are shown, it is possible the fewer or more nozzles could be used.

Figure 7:
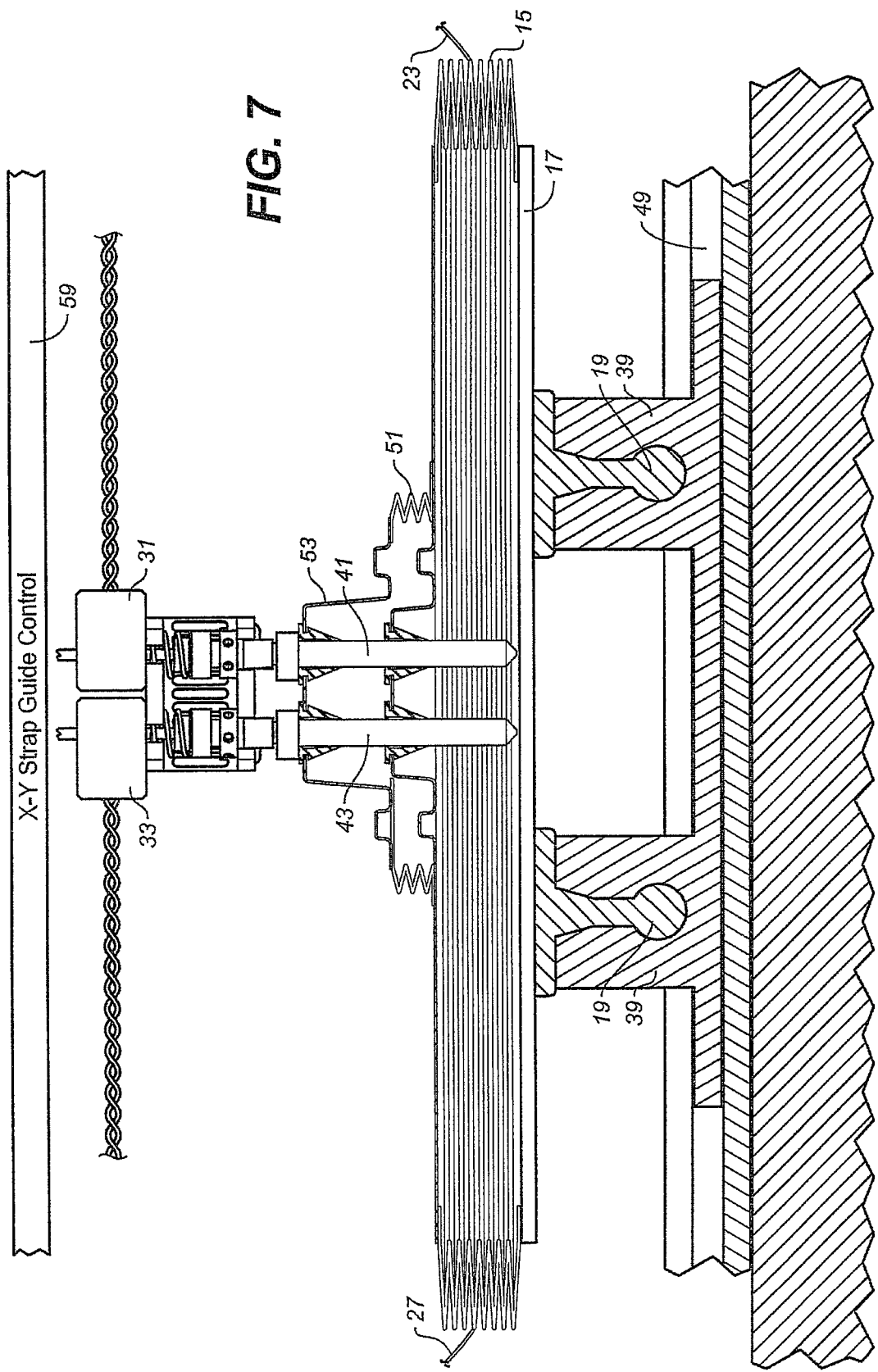
FIG. 7 is a front elevational view of the apparatus of FIG. 3 in an additive manufacturing start position.

With reference to FIG. 7, the nozzles 41 and 43 are seen to be fully entrant through the first and second valve sealable entry ports and extending through the nozzle support 53 into the minor chamber 51 and the major chamber 15, shown in a collapsed position. Note that when the entry port of the minor chamber is open as in FIG. 5 to allow nozzle entry, the entry port of the major chamber is closed. Then as the nozzles enter, the entry port of the minor chamber closes by the flap valve sliding against the entrant nozzles. Then the nozzles push open the entry port of the major valves which is momentarily open until the flaps of the flap valves close by sliding against the entrant nozzles. At no time can both nozzles simultaneously move past both sets of flap valves since entry past the valves is sequential.

Printing by the nozzles is controlled by a computer, not shown, having software that guides layer-by-layer formation of biological or other lamellas. Material used is supplied through supply lines 35 and 37. Ultraviolet or infrared lamps, not shown, may be placed on the underside of the top closure of the major chamber for accelerating curing of the lamellas. The material dispensed by the nozzles may be material for forming the desired object or one of the nozzles may carry structural support material. Software guides relative X,Y and Z motion of the nozzles from the shown starting position for printing at coordinates 0, 0, 0. As each XY layer is printed or otherwise formed, Z motion is incrementally increased and straps 23 and 27 are appropriately pulled by strap guide control 59 that is coordinated with the XY table to keep sides of the major chamber out of the way of the nozzles 41 and 43. As straps are pulled up, sidewalls of the major chamber filter air passing through the sidewalls to equalize pressure inside of the major chamber. Chamber material is selected for the desired quality of filtration. Tyvek material removes most particles yet allows air entry.

Figure 8:
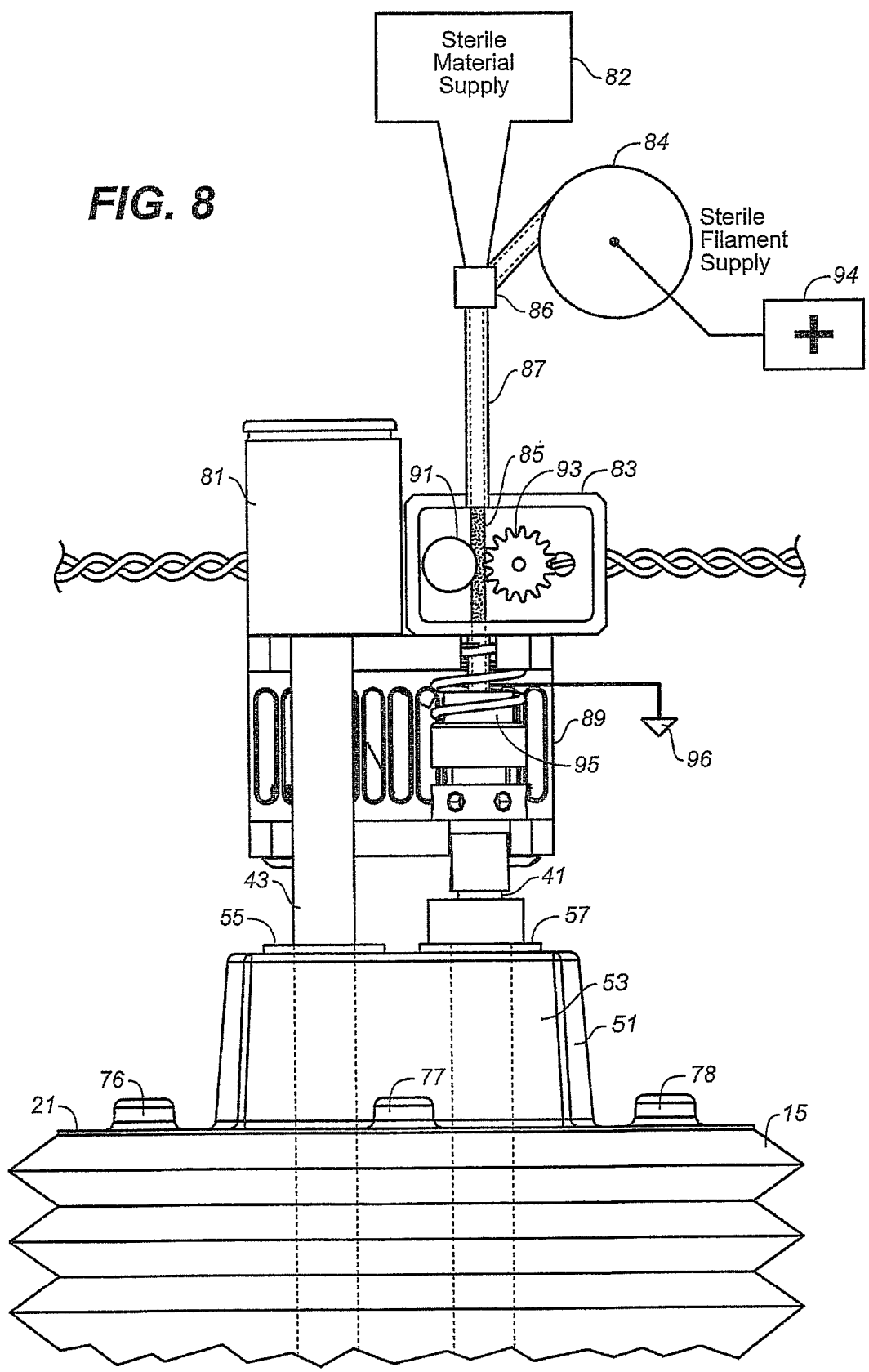
FIG. 8 is a front plan view of an enlarged portion of an alternate embodiment of the apparatus of FIG. 3.

With reference to FIG. 8, the major chamber 15 has a top closure 21 with tabs 76, 77 and 78 that allow removable joinder of the minor chamber 51 to the major chamber 15. The minor chamber 51 encloses the nozzle support 53 with nozzle holders 55 and 57 providing mechanical support for nozzles 41 and 43. Nozzle 43 is connected to printhead 81. Nozzle 41 is connected to heat sink 89 that serves to dissipate heat from extrusion material tube 85. Extrusion material tube 85 has an internal filament 87 with an insulative sleeve surrounding the material tube 85 carrying the filament that heats material to be extruded through the extrusion printhead 83. The extrusion material tube 85 is fed from sterile material supply bin 82. Filament 87 is fed from a sterile filament supply 84 into the material tube 85. Both the sterile material and the sterile filament are joined at a union 86 that is Y-shaped. Alternatively, the material tube 85 could be manufactured with an internal filament with the tube extending from the sterile material supply bin to the extrusion printhead. The insulative sleeve surrounding the material tube 85 is external to the union 86. The union supports the outside of the sleeve while the material tube feeds directly into the union. The extrusion printhead 83 contains a motor driven gear 93 that presses against extrusion material tube 85 which, in turn, bears against fixed roller 91. Gear 93 maintains heated extruded material in a well 95 that forces material into the nozzle 41. Heat sink 89 rejects excess heat by convection to the atmosphere. Printhead 81 is a conventional inkjet printhead. FIG. 8 shows dual printheads for dispensing ink and a biological extrudeable material in a side-by-side manner.

The filament is a resistive heating element, such as a nichrome wire that has a thin insulative coating so that when the wire is coiled, adjacent turns will not short. Only a few turns are stored on the sterile filament supply so that a significant amount of heat is not lost in the supply reel 84 that is energized by a DC voltage from power supply 94. Most of the filament wraps around the material tube 85 to cause sterile material from the material supply bin 82 to flow. The distal end of the filament contacts well 95 which has a ground contact 96 to complete the heating circuit.

The material tube 85 and the surrounding sleeve, as well as the extrusion printhead 83, but not a connected gear driving servomotor, not shown, as well as heat sink 89 with a material well, and nozzle 41 are all disposable. Disposing of the material contacting members maintains the compositional integrity of objects being formed by excluding old material.

Figure 9:
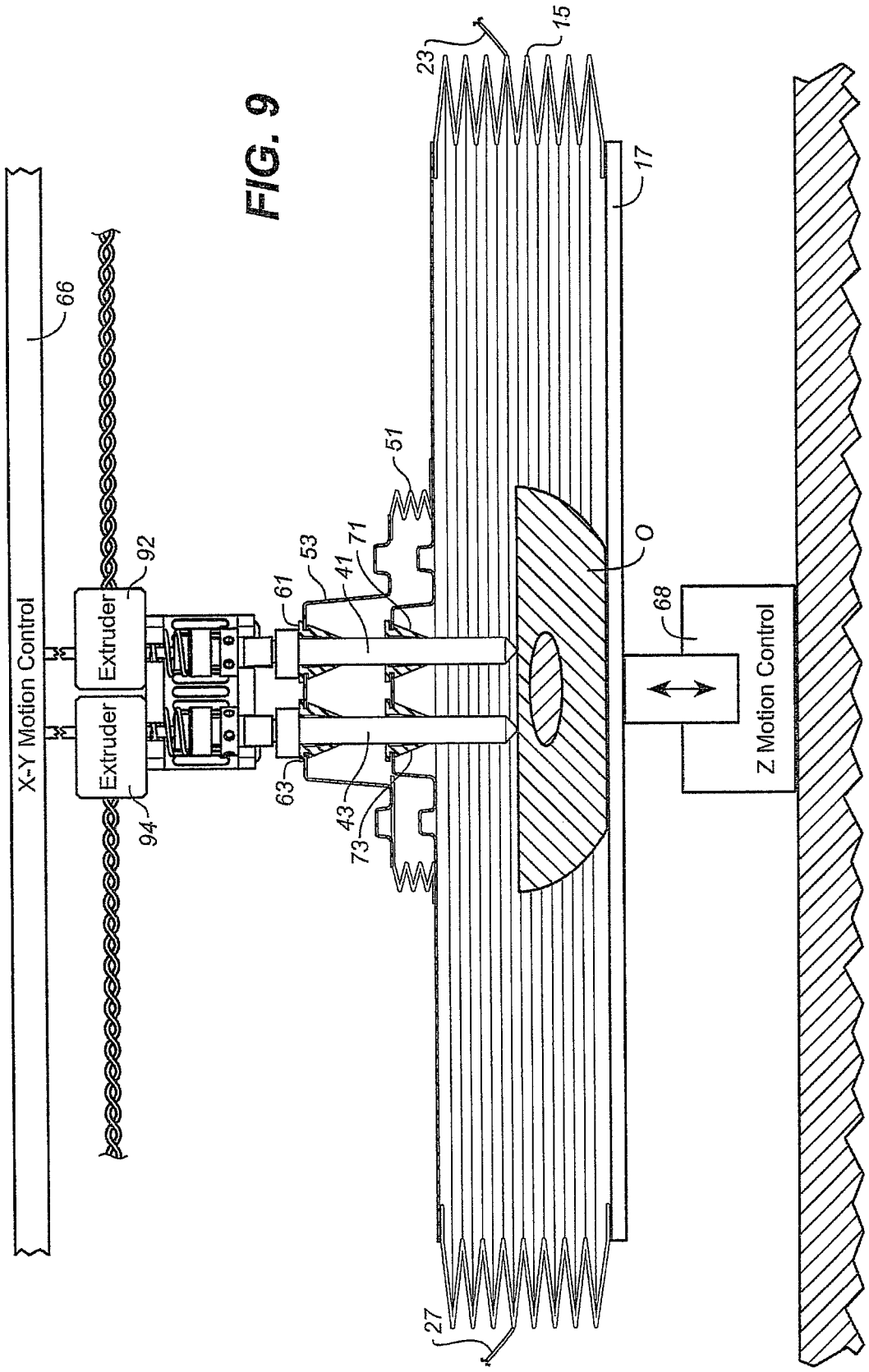
FIG. 9 is a plan view of another alternate embodiment of the apparatus of FIG. 3.

In the alternate embodiment of FIG. 9, XY motion to the nozzles 41 and 43 is provided by an X-Y table 66 situated above the nozzles. At the same time, Z motion is provided by Z motion control 68 situated below the work table 17. Nozzles 41 and 43 are associated with twin material extruders 92 and 94. The nozzles are shown penetrating a first set of flap valves 71 and 73 in the major chamber 15. The nozzles also penetrate a second set of flap valves 61 and 63 in the minor chamber 51. The nozzles are depositing material to form an object O on work table 17 in a layer-by-layer manner. The object O is within a sterile environment protected by the accordion pleated sidewalls of major chamber 15 and the double set of entry valves protecting the entry zone for nozzles 41 and 43 into major chamber 15. Use of twin extrusion nozzles improves deposition times.

When an object is completed, nozzles are withdrawn and discarded. The major chamber may be removed in a sealed room to protect the manufactured object and then may also be discarded. Before discarding the major chamber, the inside sidewalls of the major chamber may be tested for bacterial or other contamination in order to certify the integrity of the manufactured object. When withdrawing the nozzles, the minor chamber may become contaminated with printing residue. The minor chamber is preferably replaced, together with the nozzle support, at the same time as the major chamber.

What is claimed is:

1. A method for additive manufacturing in a sterile environment comprising:
    stacking a sterile minor expandable chamber on top of a major expandable chamber in a vertical arrangement for XY deposition of lamellas in a sequence for forming an object, the major expandable chamber having accordion-pleated, laterally flexible sidewalls joined to a lower base;
    providing a double set of entry valves for disposable nozzles sequentially entering the sterile expandable chambers, with only one set of entry valves being openable at a time by nozzle entry into the chambers, the nozzles arranged for XY motion relative to the base for formation of laminar layers of an object; and
    providing disposable heated material supply tubes feeding said nozzles through a disposable material extruder connected to a disposable heat exchanger.

2. The method of claim 1 further defined by heating the disposable material supply tube with a heated filament.

3. The method of claim 1 further defined by providing vertical major chamber expansion by pulling on said accordion pleated sidewalls of the major chamber for sequentially forming laminar layers of an object.

4. The method of claim 1 further defined by providing XY motion to the base relative to vertical motion of the nozzles.

5. The method of claim 1 further defined by providing motion in one of the XY directions to the base and providing motion in the other of the XY directions to the nozzles.

6. The method of claim 1 further defined by providing XY motion to the laterally flexible sidewalls.

7. A method for additive manufacturing in a sterile environment comprising:
    providing a sterile major expandable chamber for XY deposition of lamellas in a sequence for forming an object;
    providing a double set of entry valves for disposable nozzles entering the sterile major expandable chamber;
    providing disposable heated material supply tubes feeding said nozzles through a disposable material extruder connected to a disposable heat exchanger; then
    disposing of the nozzles, the heat exchanger, the extruder and the supply tube after formation of the object.

8. The method of claim 7 further defined by providing expansion of the major chamber by accordion pleated sterile sidewalls.

9. The method of claim 7 further defined by providing a minor chamber adjacent to the major chamber with one set of entry valves opening the minor chamber aligned with another set of entry valves opening the major chamber.

10. The method of claim 7 further defined by providing twin material deposition nozzles.

11. The method of claim 7 further defined by providing one material deposition nozzle and one inkjet nozzle.

12. A method for additive manufacturing in a sterile environment, comprising:
    providing an expandable pleated accordion-type, sealed major chamber having a sterile interior, the major chamber attached along a bottom edge thereof to a worktable and having a lid fastened along a top edge of the major chamber, filtered air capable of passing into the chamber as it expands;
    further providing a minor chamber that is removably fastened to the lid atop the major chamber, the major and minor chambers being separated by a set of flap valves forming double doors openable only one at a time;
    further providing at least one disposable sterile print-head nozzle that enters through the flap valves of the double doors into the major chamber, each print-head nozzle operable to deposit successive layers of material onto the worktable under computer control;
    dispensing material from the at least one print-head nozzle while providing relative lateral (x-y) motion between the worktable and the nozzle; and
    successively moving the print-head nozzle in a relative vertical (z) motion away from the baseplate while simultaneously expanding the pleated major chamber and further dispensing additional layers of material to build up a three-dimensional structure within the sterile environment of the chamber.

13. The method as in claim 12, further comprising withdrawing the at least one print-head nozzle from the major and minor chambers through the double doors, then removing the major chamber from the worktable in a sealed room to maintain sterile integrity of a finished three-dimensional structure.

14. The method as in claim 12, wherein filtered air passes into the major chamber, as the major chamber expands, through fibrous filter material forming sidewalls of the pleated, accordion-type major chamber.

15. The method as in claim 12, wherein sidewalls of the major chamber are provided with lateral guiding motion that track relative lateral movement of the print-head nozzle in relation to the worktable, while simultaneously avoiding contact of the sidewalls with the three-dimensional structure being built up layer-by-layer within the major chamber.

16. The method as in claim 15, wherein the lateral guiding motion of the sidewalls is provided by side straps attached to the sidewalls.

17. The method as in claim 12, wherein relative lateral motion is provided by moving the worktable upon a set of x rail and y rail supports.

18. The method as in claim 12, wherein relative vertical motion is provided by raising the at least one print-head nozzle.

19. The method as in claim 12, wherein relative vertical motion is provided by lowering the worktable.

20. The method as in claim 12, further providing lamps placed on an underside of a top closure of the major chamber, the lamps accelerating curing of material layers dispensed onto the three-dimensional structure being built.

* * * * *